2,785,203
Patented Mar. 12, 1957

2,785,203

5-METHYL-6-KETO-PERHYDRONAPHTHALENE-1,4-DIOL AND PROCESSES OF PREPARING THE SAME

Lewis H. Sarett, Princeton, N. J., assignor to Merck & Co., Inc., Rahway, N. J., a corporation of New Jersey No Drawing. Application October 31, 1955,
Serial No. 544,077

4 Claims. (Cl. 260—586)

This invention is concerned generally with decahydronaphthalene compounds and with processes for preparing them. More particularly, it relates to the novel compound 5-methyl-6-keto-perhydronaphthalene-1,4-diol, and with the novel process of preparing this compound starting with 5-methyl-6-alkoxy-1,4,4a,5,8,8a-hexahydronaphthalene-1,4-dione.

This application is a continuation-in-part of copending applications Serial No. 216,109, filed March 16, 1951, now abandoned, and Serial No. 310,133, filed September 17, 1952.

The new compound, 5-methyl-6-keto-perhydronaphthalene-1,4-diol, may be chemically represented as follows:

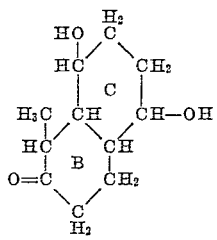

This compound possesses the BC ring system characteristic of certain members of the steroid group of compounds, and also possesses the angular methyl grouping at position 10 together with the proper functional substitution in ring C, characteristic of adrenal hormones, such as cortisone, Compound F and corticosterone. 5-methyl-6-keto-perhydronaphthalene-1,4-diol is capable of further elaboration to a steroid member and is of value as a starting material for the total synthesis of steroid hormones.

The 5 - methyl - 6 - keto-perhydronaphthalene-1,4-diol, subject of the present invention, can be prepared by a novel process which is conducted as follows: 5-methyl-6-alkoxy - 1,4,4a,5,8,8a - hexahydronaphthalene - 1,4-dione (Compound 1 hereinbelow) is reacted with hydrogen in the presence of an inert solvent and a hydrogenation catalyst to form the corresponding 5-methyl-6-alkoxy-1,2,3,4,4a,5,8,8a - octahydronaphthalene-1,4-dione (Compound 2) which is then reacted with lithium aluminum hydride to form the corresponding diol, 5-methyl-6-alkoxy - 1,2,3,4,4a,5,8,8a - octahydronaphthalene-1,4-diol (Compound 3). The latter compound is then reacted with a hydrolyzing agent to produce 5-methyl-6-keto-perhydronaphthalene-1,4-diol (Compound 4).

The reactions indicated above may be chemically represented as follows:

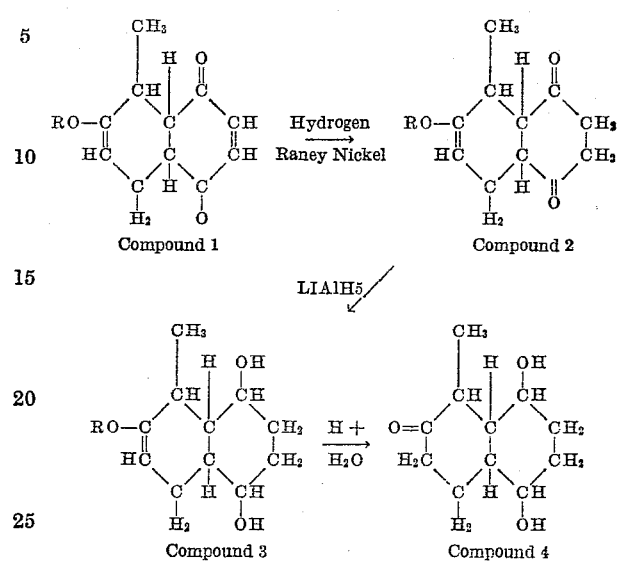

In the above formulae, R stands for an alkyl radical.

The 5 - methyl-6-alkoxy-1,4,4a,5,8,8a - hexahydronaphthalene-1,4-diones, employed as starting materials in our process, are new compounds which can be prepared by reacting the corresponding 3-alkoxy-1,3-pentadiene with benzoquinone in accordance with the Diels-Alder condensation procedure. The 3-alkoxy-1,3-pentadienes employed in this Diels-Alder procedure can be prepared starting with the corresponding β-alkoxy-propionaldehyde as follows: The β-alkoxy-propionaldehyde is reacted with ethylmagnesium bromide to produce the corresponding 1-alkoxy-3-hydroxy-pentane which is reacted with chromic acid thereby oxidizing the hydroxy substituent to form 1-alkoxy-3-keto-pentane; the latter compound is treated with an alkyl orthoformate in alcohol solution containing a trace of hydrogen chloride to produce the corresponding 1,3,3-trialkoxy-pentane which is reacted with hot potassium disulfate to produce the desired 3-alkoxy-1,3-pentadiene.

We ordinarily prefer to employ, as starting materials, 5-methyl-6-alkoxy - 1,4,4a,5,8,8a - hexahydronaphthalene-1,4-diones wherein the alkoxy substituent in the 6-position is derived from a lower aliphatic alcohol, such as 5-methyl-6-methoxy - 1,4,4a,5,8,8a - hexahydronaphthalene-1,4 - dione, 5 - methyl-6-ethoxy-1,4,4a,5,8,8a-hexahydronaphthalene-1,4-dione, 5-methyl-6-propoxy-1,4,4a,5,8,8a-hexahydronaphthalene-1,4-dione, and the like. The hydrogenation of said 5-methyl-6-alkoxy-1,4,4a,5,8,8a-hexahydronaphthalene-1,4-dione is conveniently carried out by dissolving this compound in an inert solvent such as ether, dioxane, benzene, and the like, and then bringing the resulting solution into contact with hydrogen in the presence of a hydrogenation catalyst such as Raney nickel, platinum oxide, palladium, and the like; it is ordinarily preferred to utilize Raney nickel as the hydrogenation catalyst. The hydrogenation mixture is agitated, preferably at room temperature and in contact with hydrogen at a pressure of approximately one atmosphere, until approximately one molecular equivalent of hydrogen has been absorbed, thereby forming the corresponding 5-methyl-6-alkoxy-1,2,3,4,4a,5,8,8a - octahydronaphthalene - 1,4 - dione, such as 5-methyl-6-methoxy-1,2,3,4,4a,5,8,8a - octahydronaphthalene - 1,4 - dione, 5-methyl-6-ethoxy-1,2,3,4,4a,5,8,8a - octahydronaphthalene-1,4 - dione, 5-methyl-6-propoxy-1,2,3,4,4a,5,8,8a-octahydronaphthalene-1,4-dione, and the like.

It is desired to stress that this hydrogenation, carried out in accordance with the foregoing procedure, is a selective reaction, whereby hydrogen is added to only one of the two unsaturated carbon-carbon linkages present in the starting material, namely the unsaturated linkages inside the quinoid nucleus. This is particularly surprising in view of the fact that it has been previously found that, when the unsubstituted 1,4,4a,5,8,8a-hexahydro-1,4-naphthalene-dione is treated with catalytic hydrogen, both double bonds are readily reduced. With chemical reducing agents, such as zinc and acetic acid, the quinoid double bond may be preferentially reduced but in the present series this method is always accompanied by the undesired side reaction of hydrolysis of the enol-ether linkage. In the case of diphenyl-methyl-hexahydronaphthalene-1,4-diones, either the double bond outside the quinone ring or one of the carbonyl groups, or both, are reduced. My discovery that, by utilizing hydrogen in the presence of a hydrogenation catalyst, it is possible to selectively reduce the double bond in the quinoid ring of 5 - methyl - 6 - alkoxy - 1,4,4a,5,8,8a - hexahydronaphthalene-1,4-dione, thus makes possible the production of the octahydronaphthalene compound having an enol-ether grouping at position 6 adapted for conversion into a keto grouping.

The reaction between 5-methyl-6-alkoxy-1,2,3,4,4a,5,8,8a-octahydronaphthalene-1,4-dione and lithium aluminum hydride is conducted by adding a solution of lithium aluminum hydride in an organic solvent such as tetrahydrofuran, ether, dioxane, and the like, to a solution of said octahydro-naphthalenedione compound in said solvent. The resulting suspension is ordinarily stirred at approximately room temperature until the reaction is substantially complete, which usually requires about one-half hour. The reaction product is recovered from the reaction mixture by mixing said reaction mixture with water to decompose excess reducing agent and the aqueous mixture is reacted with an organic solvent such as ether, dioxane, benzene, and the like. The organic solvent extract is then dried and evaporated to dryness to give the corresponding 5-methyl-6-alkoxy-1,2,3,4,4a,5,8,8a-octahydronaphthalene-1,4-diol, such as 5 - methyl - 6 - methoxy - 1,2,3,4,4a,5,8,8a - octahydronaphthalene-1,4-diol, 5-methyl-6-ethoxy-1,2,3,4,4a,5,8,8a-octahydronaphthalene - 1,4 - diol, 5 - methyl - 6 - propoxy - 1,2,3,4,4a,5,8,8a-octahydronaphthalene - 1,4 - diol, and the like which is obtained as a crystalline residue. The 5 - methyl - 6 - alkoxy - 1,2,3,4,4a,5,8,8a-octahydronaphthalene-1,4-diol can be purified, if desired, by recrystallization from a non-acidic solvent such as ether.

The 5 - methyl - 6 - alkoxy - 1,2,3,4,4a,5,8,8a - octahydronaphthalene-1,4-diol is then reacted with a hydrolyzing agent thereby hydrolyzing the enol-ether grouping in the 6-position of the molecule. The hydrolysis is conveniently carried out by suspending said 5-methyl-6-alkoxy - 1,2,3,4,4a,5,8,8a - octahydronaphthalene - 1,4-diol in an aqueous acid solution, preferably a dilute aqueous solution of acetic acid, and stirring the resulting acidic suspension at approximately room temperature for a period of about ten minutes. The aqueous solution is then evaporated in vacuo to give the desired 5-methyl-6-keto-perhydronaphthalene-1,4-diol which is obtained in the form of a crystalline residue.

The 5 - methyl - 6 - keto-perhydronaphthalene - 1,4-diol, thus obtained, can be converted to the therapeutically active material 3,11,20-triketo-17α-hydroxy-21-acetoxy-Δ⁴-pregnene as follows: The 5-methyl-6-keto-perhydronaphthalene-1,4-diol is reacted with N-(3-ketobutyl)-N,N-diethyl-N-methyl-ammonium iodide in the presence of potassium hydroxide to produce 7-keto-4b-methyl - 1,2,3,4,4a,4b,5,6,7,9,10,10a - dodecahydrophenanthrene-1,4-diol; this reaction is described in detail in copending application, Serial No. 228,126, filed May 24, 1951, now Patent No. 2,617,828, issued November 11, 1952. The 7-keto-4b-methyl-1,2,3,4,4a,4b,5,6,7,9,-10,10a-dodecahydrophenanthrene-1,4-diol is reacted with ethylene glycol in ethylene dichloride solution and in the presence of p-toluene sulfonic acid catalyst thereby forming 1,4 - dihydroxy - 4b - methyl - 7 - ethylenedioxy - 1,2,3,4,4a,4b,5,6,7,8,10,10a - dodecahydrophenanthrene. The 1,4-dihydroxy-4b-methyl-7-ethylenedioxy - 1,2,3,4,4a,4b,5,6,7,8,10,10a - dodecahydrophenanthrene is reacted with cyclohexanone and aluminum isopropoxide in benzene solution to produce the corresponding 1 - keto - 4 - hydroxy - 4b - methyl - 7 - ethylenedioxy - 1,2,3,4,4a,4b,5,6,7,8,10,10a - dodecahydrophenanthrene.

The 1 - keto - 4 - hydroxy - 4b - methyl - 7 - ethylenedioxy - 1,2,3,4,4a,4b,5,6,7,8,10,10a - dodecahydrophenanthrene is reacted with methyl iodide in the presence of potassium tertiary butoxide in benzene thereby forming 1 - keto - 2,4b - dimethyl - 4 - hydroxy - 7 - ethylenedioxy - 1,2,3,4,4a,4b,5,6,7,8,10,10a - dodecahydrophenanthrene; the latter compound is reacted with chromium trioxide-pyridine complex to form 1,4 - diketo - 2,4b - dimethyl - 7 - ethylenedioxy - 1,2,3,4,4a,4b,5,6,7,8,10,10a-dodecahydrophenanthrene. The 1,4-diketo-2,4b-dimethyl-7 - ethylenedioxy - 1,2,3,4,4a,4b,5,6,7,8,10,10a - dodecahydrophenanthrene is reacted with methallyl iodide in a tertiary butyl alcohol solution of aluminum tertiary butylate, thereby forming 1,4 - diketo - 2 - methallyl - 2,4b - dimethyl - 7 - ethylenedioxy - 1,2,3,4,4a,4b,5,6,7,8,10,10a-dodecahydrophenanthrene. The latter compound is reacted in ether-benzene solution with an alkoxy acetylene magnesium bromide to produce the corresponding 1-alkoxy - ethinyl - 1 - hydroxy - 2 - methallyl - 2,4b-dimethyl - 4 - keto - 7 -ethylenedioxy - 1,2,3,4,4a,4b,5,-6,7,8,10,10a-dodecahydrophenanthrene. Where it is desired to utilize another cyclic ketal, ketal, or enol-ether substituent to protect the 7-keto grouping, this is introduced in the foregoing procedure by reacting the intermediate 1,4 - dihydroxy - 7 - keto - 4b - methyl - 1,2,3,-4,4a,4b,5,6,7,9,10,10a - dodecahydrophenanthrene under substantially anhydrous conditions and in the presence of an acid catalyst, with a lower alkanol such as an excess amount of methanol, ethanol, propanol, butanol, and the like, or an excess of another low molecular weight glycol such as propylene glycol, butylene glycol, and the like. If it is desired to use an enol-ether as the protecting group, the 1,4 - dihydroxy - 7 - keto - 4b - methyl - 1,2,3,4,4a,-4b,5,6,7,9,10,10a-dodecahydrophenanthrene is reacted, under substantially anhydrous conditions in the presence of an acid catalyst with an alkyl ortho formate.

The 1 - alkoxyethinyl - 1 - hydroxy - 2 - methallyl-2,4b-dimethyl - 4 - keto - 7 - ethylenedioxy - 1,2,3,4,4a,4b,5,6,7,8,10,10a-dodecahydrophenanthrene is reacted with a dilute aqueous mineral acid solution to produce the corresponding 1 - carboalkoxymethylene - 2 - methallyl-2,4b-dimethyl - 4 - keto - 7 - ethylenedioxy - 1,2,3,4,4a,4b,5,6,7,8,10,10a - dodecahydrophenanthrene; the latter compound is reacted with an alkaline saponifying agent thereby forming 1 - carboxymethylene - 2 - methallyl - 2,4b-dimethyl - 4 - keto - 7 - ethylenedioxy - 1,2,3,4,4a,4b,5,6,7,8,10,10a - dodecahydrophenanthrene. The 1-carboxymethylene - 2 - methallyl - 2,4b - dimethyl - 4 - keto-7-ethylene - dioxy - 1,2,3,4,4a,4b,5,6,7,8,10,10a - dodecahydrophenanthrene is then reacted with an alkali metal in a lower alkanol or in liquid ammonia to produce 1 - carboxymethyl - 2 - methallyl - 2,4b - dimethyl-4-hydroxy - 7 - ethylenedioxy - 1,2,3,4,4a,4b,5,6,7,8,10,10a- dodecahydrophenanthrene. This compound is reacted with an esterifying agent, preferably an alkyl iodide in the presence of a base and/or a diazoalkane to produce the corresponding 1 - carboalkoxymethyl - 2 - methallyl-2,4b - dimethyl - 4 - hydroxy - 7 - ethylenedioxy - 1,2,3, 4,4a,4b,5,6,7,8,10,10a - dodecahydrophenanthrene. This compound is reacted with an oxidizing agent, preferably under alkaline conditions, thereby forming the corresponding 1 - carboalkoxymethyl - 2 - methallyl - 2,4b-dimethyl - 4 - keto - 7 - ethylene dioxy - 1,2,3,4,4a,4b,5, 6,7,8,10,10a-dodecahydrophenanthrene. The latter compound is reacted with osmium tetroxide to form the osmate ester of 1 - carboalkoxymethyl - 2 - (beta, gamma-dihydroxyisobutyl) - 2,4b - dimethyl - 4 - keto - 7 - ethylenedioxy - 1,2,3,4,4a,4b,5,6,7,8,10,10a - dodecahydrophenanthrene, which is reacted with an aqueous alcoholic solution of an alkali metal sulfite or bisulfite to produce the corresponding 1 - carboalkoxymethyl - 2 - (beta, gamma-dihydroxy-isobutyl) - 2,4b - dimethyl - 4 - keto-7 - ethylenedioxy - 1,2,3,4,4a,4b,5,6,7,8,10,10a - dodecahydrophenanthrene; the 1 - carboalkoxymethyl - 2 - (beta, gamma-dihydroxyisobutyl) - 2,4b - dimethyl - 4 - keto-7 - ethylenedioxy - 1,2,3,4,4a,4b,5,6,7,8,10,10a - dodeca-hydrophenanthrene is reacted with periodic acid to form the corresponding 1 - carboalkoxymethyl - 2 - acetonyl-2,4b - dimethyl - 4 - keto - 7 - ethylenedioxy - 1,2,3,4, 4a,4b,5,6,7,8,10,10a - dodecahydrophenanthrene. The latter compound is reacted, under substantially anhydrous conditions, with a strong alkali thereby forming $\Delta^5$-3-ethylenedioxy - 11,16,20-triketo - pregnene. The $\Delta^5$-3-ethylenedioxy - 11,16,20 - triketo - pregnene is reacted with an organic sulfonyl halide thereby forming the corresponding sulfonate ester of $\Delta^{5,16}$-3-ethylenedioxy-11, 20-diketo-16-hydroxy-pregnadiene, which is reacted with hydrogen in the presence of a hydrogenation catalyst to produce dl - $\Delta^5$ - 3 - ethylenedioxy-11,20-diketo-pregnene. The dl - $\Delta^5$ - 3 - ethylenedioxy - 11,20 - diketo - pregnene is treated with dimethyl oxalate and then with alkali to form the C–21 oxalyl acid derivative. On formation of the strychnine salts of the components of this racemic mixture the d-salt precipitates and may be recovered by filtration. Decomposition of this strychnine salt and hydrolysis of the C–21 oxalyl acid group yields 3-ethylenedioxy-11,20-diketo-$\Delta^5$-pregnene identical with that obtained from naturally occurring materials.

Iodination under alkaline conditions of the natural isomer of the 21-oxalyl acid of 3-ethylenedioxy-11,20-diketo-$\Delta^5$-pregnene, which may be obtained in the above described resolution procedure, yields 3-ethylenedioxy-11,20-diketo-21-iodo-$\Delta^5$-pregnene. By treatment of this latter compound with potassium acetate there is obtained 3 - ethylenedioxy - 11,20 - diketo-21-acetoxy-$\Delta^5$-pregnene of melting point 193.5–194° C.

Reaction of the last mentioned compound with hydrogen cyanide followed by dehydration of the C–20 cyanhydrin thus formed with phosphorous oxychloride yields 3 - ethylenedioxy - 11 - keto-20-cyano-21-acetoxy-$\Delta^{5,17}$-pregnadiene, which may be oxidized with potassium permanganate to 3 - ethylenedioxy - 11,20 - diketo-17$\alpha$-hydroxy - 21 - acetoxy - $\Delta^5$ - pregnene. 3,11,20-triketo-17$\alpha$ - hydroxy - 21 - acetoxy - $\Delta^4$ - pregnene, alternatively known as cortisone acetate, may be prepared by acid hydrolysis of the above mentioned 3-ethylenedioxy-11,20-diketo-17$\alpha$-hydroxy-21-acetoxy-$\Delta^5$-pregnene.

The following examples illustrate methods of carrying out the present invention, but it is to be understood that these examples are given for purposes of illustration and not of limitation.

*Example 1*

A solution containing 510 g. (5.0 moles) of $\beta$-ethoxy-propionaldehyde dissolved in 500 cc. of ether was added, with stirring over a period of one and one-half hours, to a solution of ethyl magnesium bromide prepared from 158.2 g. (6.5 moles) of magnesium and 715 g. (6.55 moles) of ethyl bromide. The resulting mixture was allowed to stand for a period of fifteen hours. At the end of this time, 1070 cc. of a saturated aqueous solution of aluminum chloride was added to the Grignard solution, while rapidly stirring the mixture and maintaining the temperature at about 0° C. The resulting mixture was filtered and the filtered ethereal solution was evaporated in vacuo to give a liquid which was distilled in vacuo to give substantially pure 1-ethoxy-3-hydroxy-pentane; B. P. 55° C. at 0.1 mm.

A solution containing 796 g. (8.1 moles) of concentrated sulfuric acid and 220 cc. of water was added slowly to a cold solution containing 606 g. (2.0 moles) of sodium dichromate in 400 cc. of water. The resulting cold solution of chromic acid was added, over a five-hour period, to 581 g. (4.4 moles) of 1-ethoxy-3-pentanol, while rapidly stirring the resulting mixture and maintaining the temperature thereof at about 10° C. During the addition of the chromic acid solution, 1500 cc. of benzene were added to the reaction mixture to keep it fluid. Sufficient water was then added to the reaction mixture to dissolve the chromium salts and, after shaking the resulting aqueous mixture, the aqueous layer was separated and set aside; the benzene layer was washed with three 100 cc. portions of water, with one portion of an aqueous solution of a mild base, and with one additional portion of water. The washed benzene solution was dried over anhydrous calcium sulfate. The aqueous layer and the three initial water washes were combined and extracted twice with petroleum ether. The petroleum ether extracts, after two water washes, were dried, combined with the dry benzene extract, and the resulting solution was evaporated in vacuo. The residual liquid was purified by fractional distillation in vacuo to give substantially pure 1-ethoxy-3-keto-pentane; B. P. 45° C. at 0.3 mm.

Three cubic centimeters of 1 N ethanolic hydrogen chloride were added to a solution containing 472 g. (3.6 moles) of 1-ethoxy-3-keto-pentane, 605 g. (4.1 moles) of ethyl orthoformate and 640 cc. (11 moles) of absolute ethanol. The resulting mixture was allowed to stand at room temperature for a period of forty hours, during which time, at scattered intervals and in small portions, a total of twenty-four additional cubic centimeters of 1 N ethanolic hydrogen chloride was added to catalyze the reaction. At the end of the forty-hour reaction period, the unreacted ethanol and ethyl orthoformate were evaporated from the reaction mixture in vacuo. The residual liquid was fractionally distilled in vacuo to give substantially pure 1,3,3-triethoxy-pentane; B. P. 69° C. at 1.4 mm.

A dropping funnel containing 187 g. (0.92 mole) of 1,3,3-triethoxy-pentane was fitted directly onto a distilling flask in which was placed 0.1 g. of fused potassium bisulfate. The flask temperature was maintained at 160° C. for eight hours during which time the 1,3,3-triethoxy-pentane was added dropwise onto the hot surface of the potassium bisulfate and simultaneously dealcoholated. (At the end of each hour an additional 0.1 g. of potassium bisulfate was added.) The resulting vapors were condensed and collected over an aqueous solution of potassium bicarbonate. The distillate was mixed with 100 cc. of ether, the aqueous-ethanol mixture was shaken, and the ethereal layer was separated. The ethereal solution was washed, dried over anhydrous calcium carbonate, filtered, and the ether was evaporated from the dry ethereal solution. The residual liquid was fractionally distilled to give substantially pure 3-ethoxy-1,3-pentadiene; B. P. 55° C. at 52 mm.

A mixture of 7.0 g. of 3-ethoxy-1,3-pentadiene and 4.3 g. of benzoquinone was shaken in a sealed flask until the mixture became warm and the quinone dissolved. The resulting solution was allowed to stand at room temperature for a period of twenty hours, and the mixture was then cooled. The crystalline product thus formed was washed with cold petroleum ether and the washed product was dried and heated in vacuo thereby evaporating unreacted benzoquinone. The residual material was then recrystallized from methanol to give 6.9 g. of substantially pure 5-methyl-6-ethoxy-1,4,4a,5,8,8a-hexahydronaphthalene-1,4-dione; M. P. 69–70° C.

*Example 2*

A mixture of 17 g. of 5-methyl-6-ethoxy-1,4,4a,5,8,8a-hexahydronaphthalene-1,4-dione (prepared as described above) and 9 g. of Raney nickel catalyst in 200 cc. of benzene was treated with hydrogen until one molecular equivalent of hydrogen had been absorbed. The catalyst was then filtered off, and the solution was evaporated to small volume and cooled, whereupon rosettes of needles crystallized. These were recovered by filtration and dried to produce 5-methyl-6-ethoxy-1,2,3,4,4a,5,8,8a-octahydronaphthalene-1,4-dione; M. P. 118–122° C. *Analysis.*—Calc'd for $C_{13}H_{18}O_3$: C, 70.22; H, 8.17. Found: C, 70.04; H, 8.41.

*Example 3*

Four and eight-tenths grams of 5-methyl-6-ethoxy-1,2,3,4,4a,5,8,8a-octahydronaphthalene-1,4-dione were dissolved in 50 cc. of anhydrous tetrahydrofuran and the solution added to a solution of 2.5 g. of lithium aluminum hydride in 100 cc. of anhydrous tetrahydrofuran. The resulting suspension was stirred for one-half hour, and then allowed to stand at room temperature for a period of twenty hours. The mixture thus obtained was poured into 1 cc. of water and the aqueous mixture was extracted with benzene. The dried benzene solution was evaporated to dryness, leaving a crystalline residue of 5-methyl-6-ethoxy-1,2,3,4,4a,5,8,8a-octahydronaphthalene-1,4-diol. This material was purified by recrystallization from ether to give substantially pure 5-methyl-6-ethoxy-1,2,3,4,4a,5,8,8a-octahydronaphthalene-1,4-diol; M. P. 118–122° C. *Analysis.*—Calc'd for $C_{13}H_{22}O_3$: C, 68.98; H, 9.81. Found: C, 68.98; H, 9.98.

*Example 4*

To a suspension of 3.8 g. of 5-methyl-6-ethoxy-1,2,3,4,4a,5,8,8a-octahydronaphthalene-1,4-diol in 10 cc. of water was added 0.3 cc. of acetic acid. The suspension was stirred for ten minutes and excess water was removed in vacuo to give a crystalline residue of 5-methyl-6-keto-perhydronaphthalene-1,4-diol; M. P. 194–196° C. *Analysis.*—Calc'd for $C_{11}H_{18}O_3$: C, 66.62; H, 9.15; Found: C, 66.72; H, 9.03.

Various changes and modifications may be made in carrying out the present invention without departing from the spirit and scope thereof. Insofar as these changes and modifications are within the purview of the annexed claims they are to be considered as part of my invention.

I claim:

1. The process of preparing 5-methyl-6-keto-perhydronaphthalene-1,4-diol which comprises reacting hydrogen with 5-methyl-6-alkoxy-1,4,4a,5,8,8a-hexahydronaphthalene-1,4-dione in the presence of a hydrogenation catalyst selected from the group which consists of noble metal and nickel catalysts, thereby forming 5-methyl-6-alkoxy-1,2,3,4,4a,5,8,8a-octahydronaphthalene-1,4-dione, reacting the latter compound with lithium aluminum hydride to produce 5-methyl-6-alkoxy-1,2,3,4,4a,5,8,8a-octahydronaphthalene-1,4-diol, and reacting this compound with an aqueous acidic solution.

2. The process which comprises reacting hydrogen with 5-methyl-6-ethoxy-1,4,4a,5,8,8a-hexahydronaphthalene-1,4-dione, said reaction being carried out by bringing the reactants together in benzene in the presence of Raney nickel catalyst, thereby forming 5-methyl-6-ethoxy-1,2,3,4,4a,5,8,8a-octahydronaphthalene-1,4-dione, reacting the latter compound in solution in tetrahydrofuran with lithium aluminum hydride to form 5-methyl-6-ethoxy-1,2,3,4,4a,5,8,8a-octahydronaphthalene-1,4-diol, and reacting this compound with an aqueous acidic solution to produce 5-methyl-6-keto-perhydronaphthalene-1,4-diol.

3. The process which comprises reacting 5-methyl-6-alkoxy-1,2,3,4,4a,5,8,8a-octahydronaphthalene-1,4-diol with an aqueous acidic solution thereby hydrolyzing the enol-ether grouping in the 6-position of the molecule to produce 5-methyl-6-keto-perhydronaphthalene-1,4-diol.

4. 5-methyl-6-keto-perhydronaphthalene-1,4-diol.

No references cited.